US005420575A

United States Patent [19]

Cheraso et al.

[11] Patent Number: 5,420,575

[45] Date of Patent: May 30, 1995

[54] METHOD AND APPARATUS FOR MARKING TRANSLUCENT PLASTICS

[75] Inventors: John P. Cheraso; Donald P. Gebbia, both of Boynton Beach, Fla.

[73] Assignee: Motorola, Inc., Schaumburg, Ill.

[21] Appl. No.: 909,516

[22] Filed: Jul. 6, 1992

[51] Int. Cl.$^6$ .......... H04Q 7/00; B41M 5/26; B23K 26/00

[52] U.S. Cl. .......... 340/825.44; 206/459.5; 219/121.6; 219/121.69; 264/132; 361/757

[58] Field of Search .......... 346/76 L; 219/121.6, 219/121.69; D10/30, 31, 32; 340/825.44; D14/142, 140, 148; 379/433, 428, 429; 455/90, 89; 361/757, 679; 174/52.4; 156/272.8; 264/129, 132; 206/459.5

[56] References Cited

U.S. PATENT DOCUMENTS

| | | | |
|---|---|---|---|
| D. 318,663 | 7/1991 | Frisinger | D14/151 |
| 2,595,973 | 5/1952 | Neugass | 250/465.1 |
| 4,307,047 | 12/1981 | Edinger et al. | 219/121.6 |
| 4,753,863 | 6/1988 | Spanjer | 264/132 |
| 4,822,973 | 4/1989 | Fahner et al. | 219/121.6 |
| 4,850,488 | 7/1989 | Humbert | 206/459.5 |
| 5,049,721 | 9/1991 | Parnas et al. | 219/121.69 |
| 5,049,874 | 9/1991 | Ishida et al. | 340/825.44 |
| 5,191,979 | 3/1993 | Nemeroff | 206/459.5 |
| 5,248,878 | 9/1993 | Ihara | 219/121.69 |

FOREIGN PATENT DOCUMENTS

| | | | |
|---|---|---|---|
| 2186153 | 8/1987 | United Kingdom | H04M 1/22 |

*Primary Examiner*—Donald J. Yusko
*Assistant Examiner*—Edward Merz
*Attorney, Agent, or Firm*—Pablo Meles; John H. Moore

[57] ABSTRACT

A substantially transparent housing (202) for an electronic device (100) is capable of enclosing at least one component (502, 504). The enclosed at least one component (502, 504) can be visible from the outside of the housing (202). The housing (202) includes an outer surface (701) and an inner surface (702). A portion of the inner surface (703) is textured to provide a translucent surface. A portion of the outer surface (704) overlaps the textured portion of the inner surface (703). The overlapping portion of the outer surface (704) has opaque marks (602). The opaque marks (602) provide information visible from the outside of the housing (202). A method is also provided for applying the opaque marks (602) to the housing (202).

19 Claims, 4 Drawing Sheets

METHOD AND APPARATUS FOR MARKING TRANSLUCENT PLASTICS

FIELD OF THE INVENTION

This invention relates generally to applying markings to plastics, and more particularly to a method and apparatus for directly marking a translucent plastic layer.

BACKGROUND OF THE INVENTION

Modern selective call receivers, e.g., pagers, generally include circuit supporting substrates, e.g., printed circuit boards, with electronic components mounted thereon, substantially enclosed within a plastic housing. A trend in the market is for transparent plastic housings, optionally dyed to one or more colors. The transparent characteristic makes the internal printed circuit boards and electronic components visible from outside the housing. This feature provides a cosmetically pleasing and futuristic appearance to the pager.

One or more opaque labels applied to the outer surface of the housing provide required labeling information to the final delivered product. For example, a logo provides a graphical identification of an organization marketing the product to consumers. Also, a bar code commonly identifies product information to scanning devices. Text can also be applied to labels to communicate information about the product. The information provided on these labels is necessarily provided for doing business in today's marketplace.

Regrettably, the opaque labels detract from the transparent characteristic of the plastic housing. Additionally, the application of the labels to the outer surface of the housing adds steps to the manufacturing process which adds opportunities for introducing defects to the product and adds cost.

Thus, what is needed is a method and apparatus for directly marking the transparent plastic housing with the required information.

SUMMARY OF THE INVENTION

According to an embodiment of the present invention, there is provided a substantially transparent housing for an electronic device. The housing is capable of enclosing at least one component therein, where the enclosed at least one component can be visible from the outside of the housing. The housing comprises an outer surface and an inner surface, a portion of the inner surface being textured to provide a translucent surface, and a portion of the outer surface overlapping the textured portion of the inner surface. The overlapping portion of the outer surface has opaque marks. The opaque marks provide information visible from the outside of the housing. A method is also provided for applying the opaque marks to the housing.

DESCRIPTION OF A PREFERRED EMBODIMENT

Figure 1:
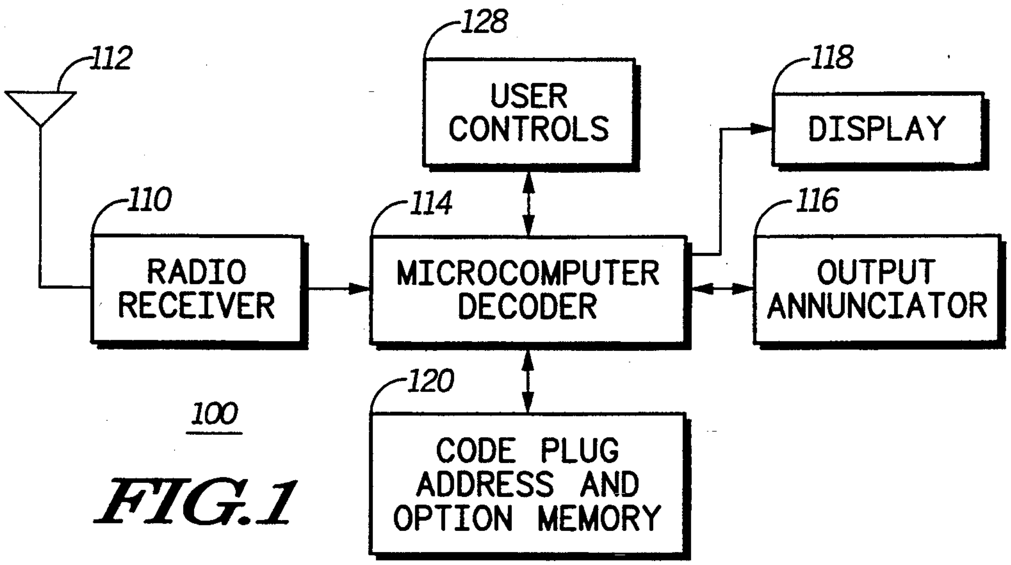
FIG. 1 is a block diagram of a paging receiver, in accordance with the present invention.

FIG. 1 is an electrical block diagram of a selective call receiver, e.g. a pager 100. It includes radio receiver circuitry 110 which receives signals via an antenna 112. The received signals include paging information. Selective call receivers can respond to transmitted information containing various combinations of tone, tone and voice, or data messages in a variety of modes. This information may be transmitted using several paging coding schemes and message formats.

The output of the radio receiver circuitry 110 is applied to a microcomputer decoder 114 which processes the information contained in the received signals, to decode any received message. As can be seen, the microcomputer decoder 114 communicates with an output annunciator 116, such as a transducer or speaker, to alert a user that a message has been received, with a display 118, such as a liquid crystal display (LCD), to present a message via the display 118, and with a code plug address and option memory 120 to retrieve predetermined address and function information. Normally, after a received address matches a predetermined address in the pager 100, the output annunciator 116 alerts the user that a message has been received. The user can activate user controls 128, such as buttons or switches, to invoke functions in the pager 100, and optionally to view the received message on the display 118. The operation of a paging receiver of the general type shown in FIG. 1 is well known and is more fully described in U.S. Pat. No. 4,518,961, issued May 21, 1985, entitled "Universal Paging Device with Power Conservation" which is assigned to the same assignee as the present invention and is incorporated herein by reference.

Figure 2:
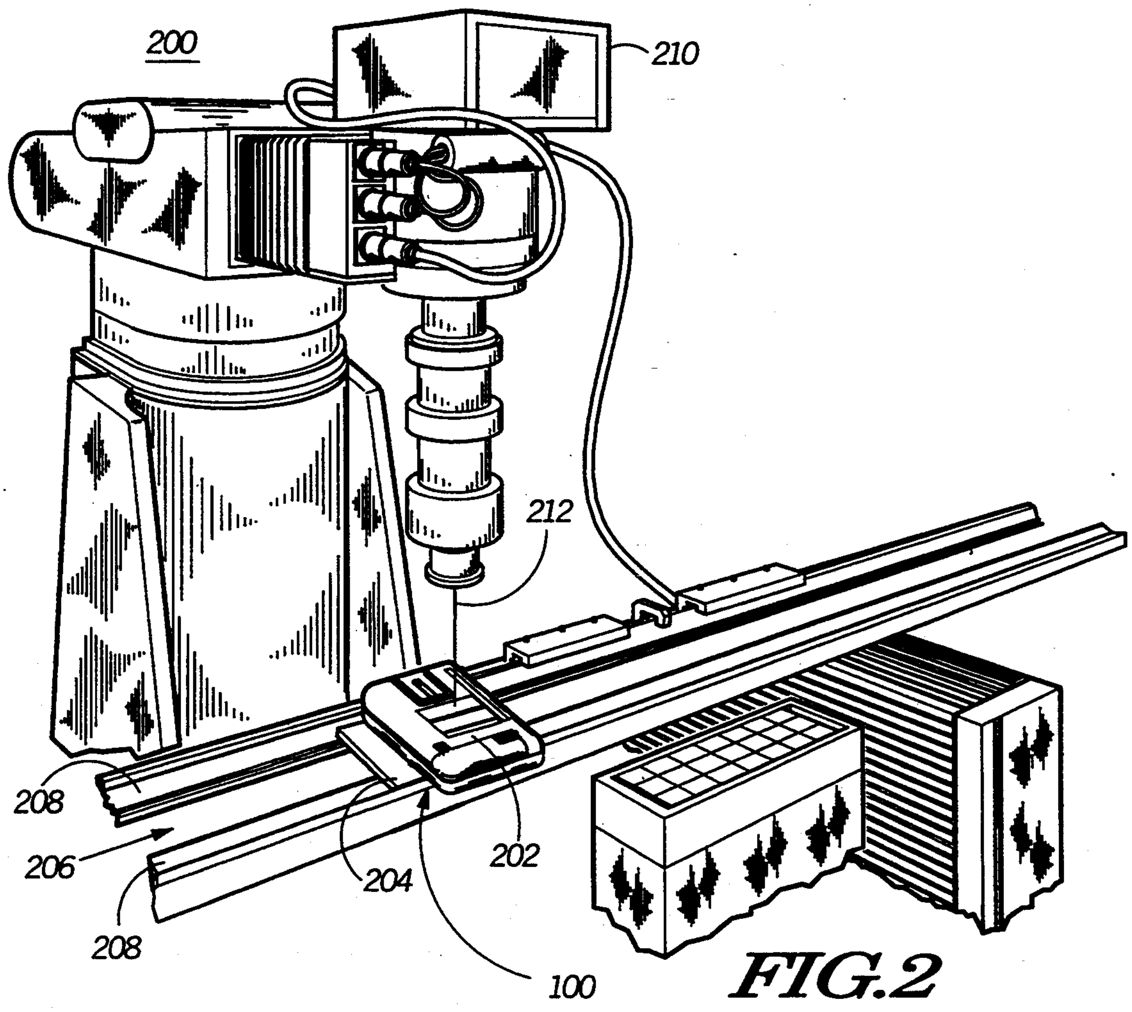
FIG. 2 is a perspective view illustrating a laser marking process in a pager manufacturing line, in accordance with the preferred embodiment of the present invention.

FIG. 2 is a perspective view illustrating a laser marking process in a pager manufacturing line, in accordance with the preferred embodiment of the present invention. For modern high-volume manufacturing environments, preferably, the pager 100 travels on a pallet 204 down an automated production line 206, being guided by tracks 208. As each pager 100 is manufactured, visible information is applied to the exterior of the pager housing 202 to identify parameters or information associated with the particular pager 100. This information is preferably generated dynamically, at the time the pager 100 is manufactured. Typically, the information to apply to each pager 100 is not predetermined early enough to create premarked labels. The marking process is preferably flexible with the manufacturing process. A robotic laser marking station 200 is the preferred means of applying marks to the exterior of the pager housing 202.

When the pallet 204 reaches the laser marking station 200, the laser robot 210 focuses a laser beam 212 about the outer surface of the pager housing 202. The laser robot 210 steers the laser beam 212 over the outer surface of the pager housing 202 in a predetermined pattern to create one or more marks on the outer surface of the pager housing 202 to represent visible information on the pager housing 202. For example, the one or more marks can represent bar code information, graphical information such as a logo, numeric information, and alphanumeric information. Normally, this information on the outer surface of the pager housing 202 is required for doing business in today's marketplace.

Although automatic laser marking of pager housings is the preferred mode of operation, lending itself well to a flexible automated factory, other means of applying marks to the outer surface of the pager housing 202 may also be acceptable. For example, marks can be applied using an ink based marker or other similar marking tool. Alternatively, applying focused heat, such as by using a heated probe or similar tool, can create the desired marks on the outer surface of the housing 202. Of course, the marking process can also be performed manually.

Figure 3:
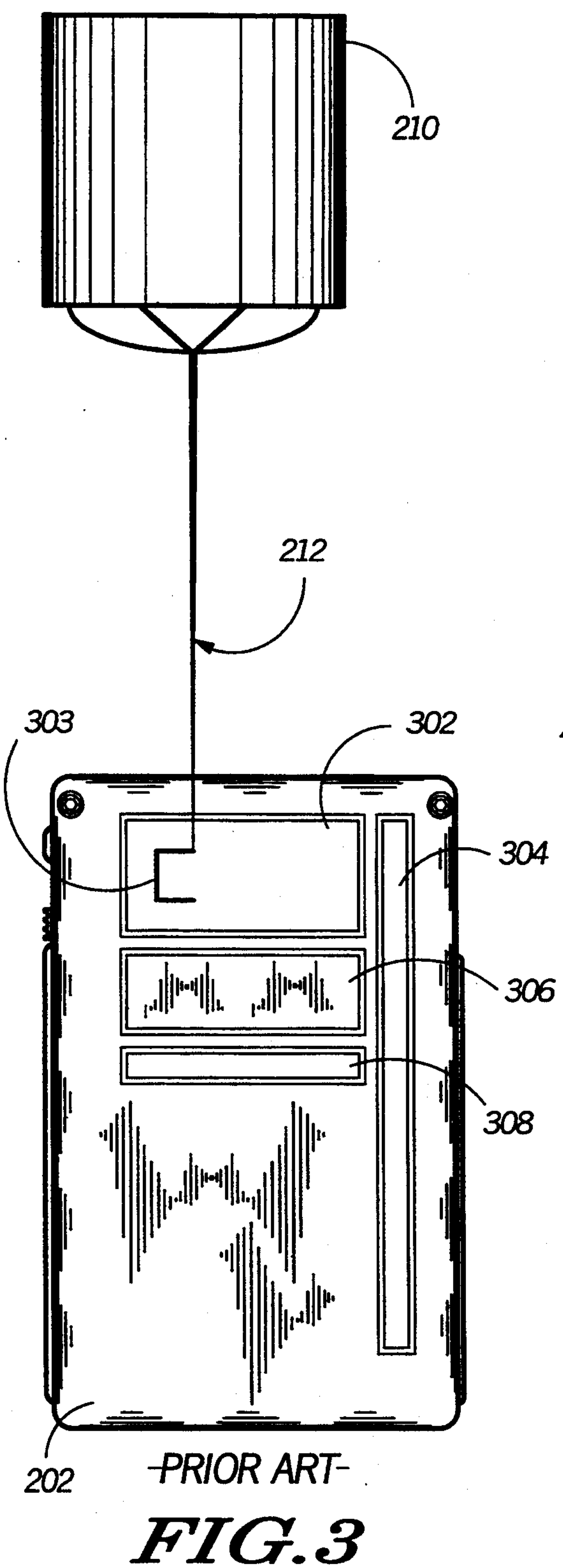
FIG. 3 is a top view of a prior art laser marking process utilizing labels on a housing.

FIG. 3 is a top view of a prior art laser marking process utilizing labels 302, 304, 306, 308, on the pager housing 202. The robotic laser 210 focuses the laser beam 212 on one of the labels 302 to apply at least one mark 303 thereon. The robotic laser 210 steers the laser beam 212 over the surface of the label 302 to create the mark 303. Once the label 302 has been properly marked with the required information the robotic laser 210 then focuses the laser beam 212 on the next label to apply one or more marks thereto. For example, bar code information may be applied to the long thin label 304. When all the labels 302, 304, 306, 308 have been marked with the required information for the particular pager, the pager 100 on its pallet 204 can move to a subsequent station on the production line and a new pager can then enter the robotic laser marking station 200 as necessary.

There are a number of drawbacks to using labels 302, 304, 306, 308 on the pager housing 202 for applying the required information thereon. For example, the labels 302, 304, 306, 308, add cost to the product. The application of the labels 302, 304, 306, 308, to the housing 202 add time delay to the overall manufacturing process. The application of the labels 302, 304, 306, 308, also adds opportunities for introducing defects to the product during manufacturing. Additionally, for products including substantially transparent housings, the labels 302, 304, 306, 308, can detract from the cosmetically pleasing appearance of the substantially transparent housing.

Figure 4:
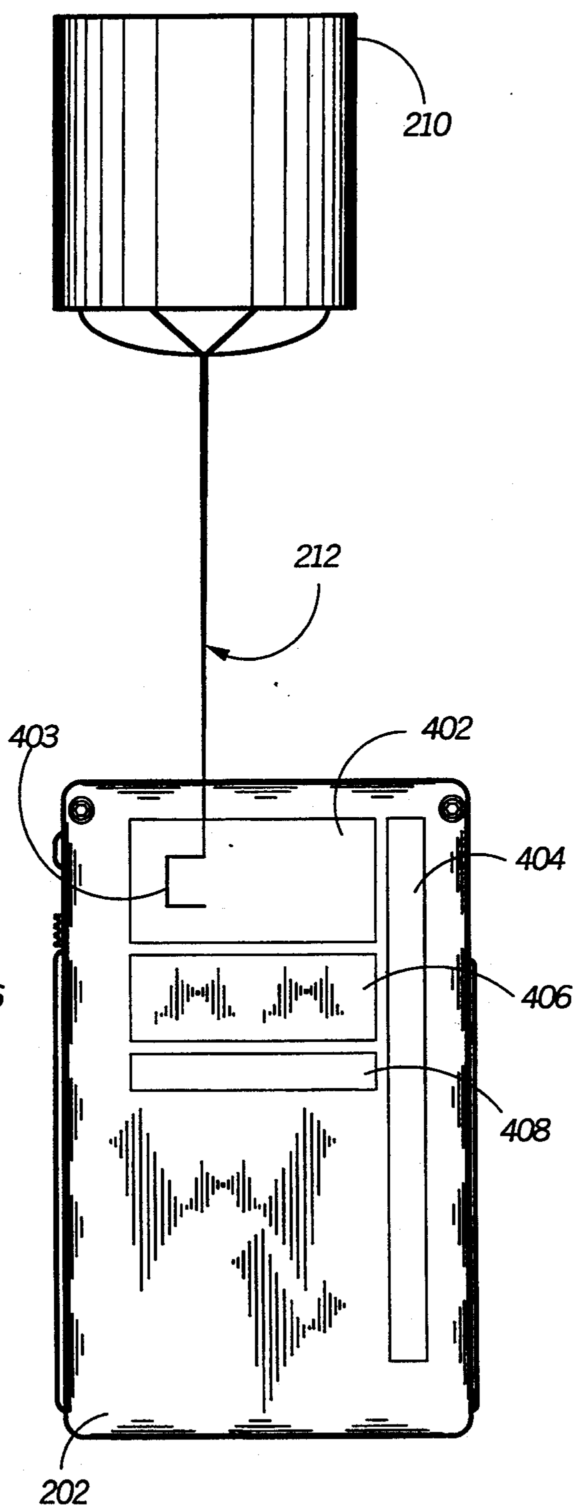
FIG. 4 is a top view of a laser applying a mark directly on a housing, according to the preferred embodiment of the present invention.

FIG. 4 is a top view of the robotic laser 210 applying a mark 403 directly on an outer surface 402 of the housing 202, according to the preferred embodiment of the present invention. As may be appreciated by now, it is very desirable to apply a visible mark 403 directly on an outer surface 402 of the housing 202. This saves time and cost in the manufacturing process as well as enhances the quality of the final delivered product. As shown, the robotic laser 210 can apply visible marks to designated areas 402, 404, 406, 408, on the outer surface of the pager housing 202. For example, bar code information can be applied to the long thin area 404 on the outer surface of the pager housing 202.

Figure 5:
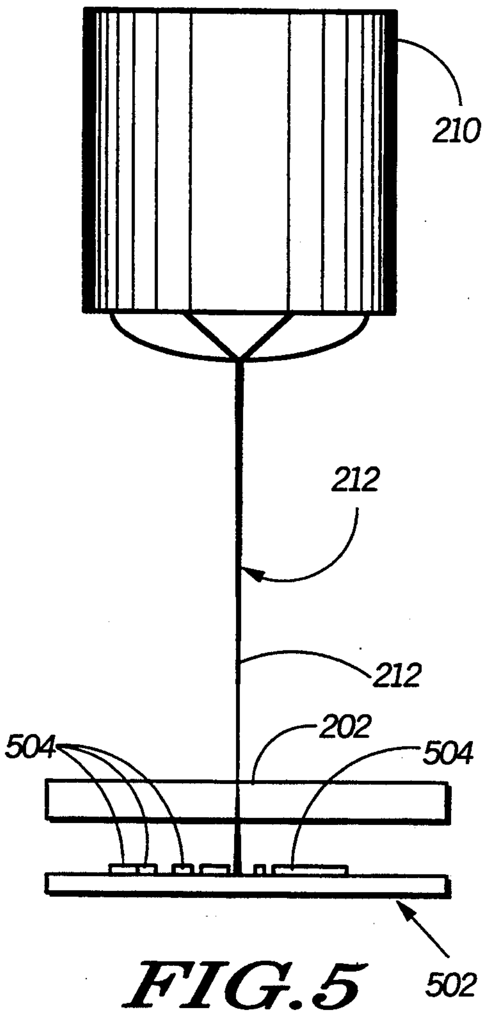
FIG. 5 is a side view of a laser applying a mark to a substantially transparent housing.

FIG. 5 is a side view of the robotic laser 210 applying a mark to a substantially transparent housing 202. Preferably, the housing 202 is constructed from plastic, such as LEXAN 141R Polycarbonate Resin Plastic. The housing 202 being substantially transparent provides visibility to the components enclosed within the housing. These components may include the circuit supporting substrate 502, and the integrated circuits and other electronic components 504.

Because the housing 202 is substantially transparent, it inherently transmits light. When the laser beam 212 focuses about the outer surface of the housing 202 there is still a depth of field which transmits sufficient laser energy through the housing to the internal components 502, 504. The transmitted energy of the laser beam 212 can seriously affect delicate components 502, 504, within the housing 202.

Figure 6:
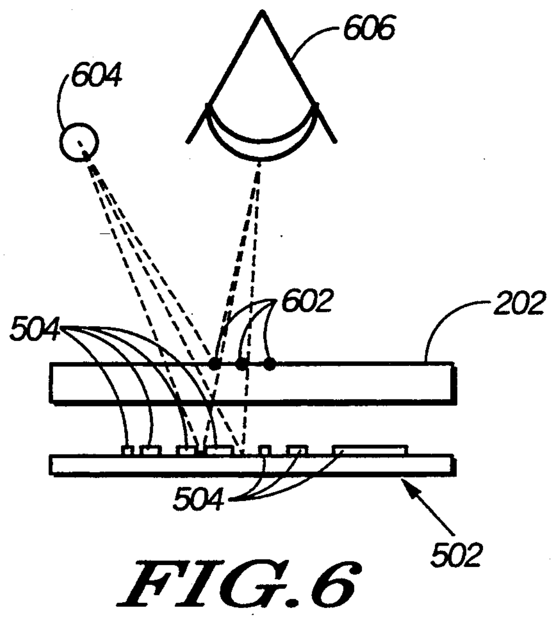
FIG. 6 is a side view of a substantially transparent housing being viewed under ambient lighting.

Another potential problem is illustrated in FIG. 6. The substantially transparent housing 202 is shown having opaque marks 602 on the outer surface of the housing 202. Under ambient lighting 604 the internal components 502, 504, are visible to a viewer 606 from the outside of the housing 202 as a complex background pattern behind the opaque marks 602. The contrast between the opaque marks 602 and the complex background pattern created by the internal components 502, 504, can be very poor, making it difficult to recognize the opaque marks 602 from the background pattern. While this can be frustrating for normal human visual recognition of the opaque marks 602, it can be especially troublesome for automated scanners such as bar code scanners. A solution to both of these problems is discussed below.

Figure 7:
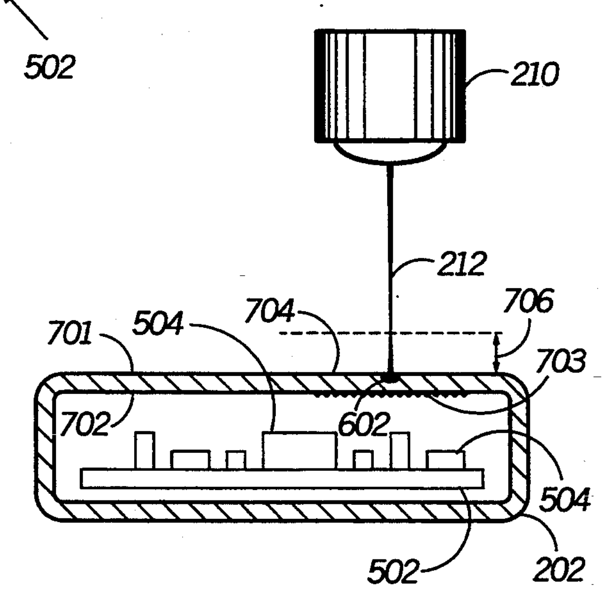
FIG. 7 is a side cut-away view of a substantially transparent pager housing having a laser applying a mark thereto, according to the preferred embodiment of the present invention.

FIG. 7 is a side cut-away view of the substantially transparent pager housing 202 having the robotic laser 210 applying an opaque mark 602 to the outer surface thereof, according to the preferred embodiment of the present invention. The circuit supporting substrate 502 and other components 504 are enclosed within the housing 202. These components 502, 504, may include electrical components for performing functions in the pager 100. For example, the components 502 can include at least one of the receiver circuitry 110 (FIG. 1), the decoder 114, the display 118, and the output annunciator 116.

The housing 202 is preferably constructed of Lexan 141R Polycarbonate Resin Plastic. Optionally, one or more colored dyes can be included in the plastic resin, such as the colors yellow, blue, green, red, or other aesthetically pleasing coloring as requested by the customer. Because the housing 202 is substantially transparent, the internal components 502, 504, can be visible from the outside of the housing 202.

The housing 202 comprises an outer surface 701 and an inner surface 702. A portion of the inner surface 703 is textured to provide a translucent surface. Preferably, very fine texturing is formed into the portion of the inner surface 703 during a molding operation. Optionally, a course texture can also be formed on the outer surface 701 of the housing 202 during the molding operation. This course texture on the outside of the housing 202 helps eliminate fingerprints and scratches. In the preferred embodiment, the robotic laser 210 creates the opaque mark 602 on a portion of the outer surface 704 that overlaps the textured portion of the inner surface 703.

Preferably, the robotic laser 210 focuses the laser beam 212 just above the portion of the outer surface 704 at a mean focus point of approximately 0.050" (1.27 mm) 706 above the outer surface 704 of the housing 202. Below the mean focus point 706, the laser beam 212 tends to spread and the beam energy is not as focused. The laser beam 212, however, can still deliver sufficient energy through the depth of field below the mean focus point to effect a chemical change on the plastic to create the opaque mark 602. Typically, the laser energy on the plastic changes the chemical properties of the plastic to create a black mark or opaque mark 602 that prevents light from transmitting through the plastic at the mark 602. The surrounding plastic is not affected and remains substantially transparent. Also, by maintaining the surface 704 just below the mean focus point 706 it helps assure that the laser beam energy will not burn all the way through the plastic housings 202 and into the internal components 502, 504.

Additionally, the textured portion of the inner surface 703 tends to disrupt (refract) the remaining laser beam 212 extending below the mean focus point 706. This helps protect the internal components 502, 504, from being seriously affected by the laser beam 212 during the marking process.

Figure 8:
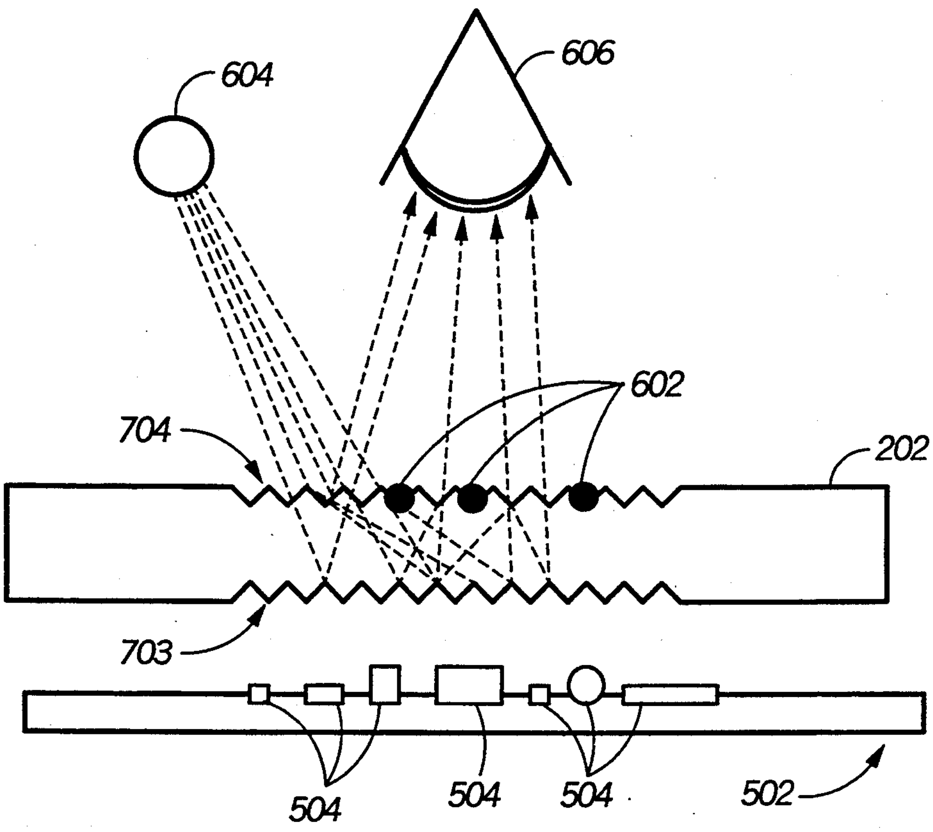
FIG. 8 is a side cut-away view of a pager housing having marks applied thereto being viewed under ambient lighting, in accordance with the preferred embodiment of the present invention.

FIG. 8 is a side cut-away view of the substantially transparent pager housing 202 having the opaque marks 602 applied thereto being viewed under ambient lighting 604, in accordance with the preferred embodiment of the present invention. As shown, the textured portion of the inner surface 703 of the housing 202 provides at least a partially light reflective surface that tends to reflect the ambient light 604 toward the overlapping portion of the outer surface 704. The light reflecting between the inner surface 703 and the outer surface 704 tends to give an opaque appearance or glow to the portion of the outer surface 704 generally overlapping the textured portion of the inner surface 703. This glowing background tends to significantly increase the contrast with the opaque marks 602 on the portion of the outer surface 704 of the housing 202. This, therefore, enhances the visibility of the opaque marks 602 as viewed 606 from the outside of the housing 202.

Optionally, the portion of the outer surface 704 can also be textured to provide at least a partially light reflective surface on the housing 202. This helps reflect additional light to the viewer 606 and provides additional contrast to the opaque marks 602. Consequently, the opaque marks 602 are more visible and distinguishable from the background.

Additionally, the translucent inner surface 703, and optionally the translucent outer surface 704, tend to blend well with the remaining substantially transparent housing 202 in an aesthetically pleasing arrangement. The internal components 502, 504, are still visible through the substantially transparent housing 202, while the opaque marks 602 are better contrasted against the glowing background of the reflecting light. The light reflecting from the internal components 502, 504 below the textured portion of the inner surface 703 tends to be diffused by the textured inner surface 703. Consequently, the combination of the glowing background from the increased reflecting light and the diffused background pattern of the internal components 502, 504, significantly enhances the contrast between the opaque marks 602 and the background. The opaque marks 602, therefore, are more visible and recognizable by a viewer 606.

Figure 9:
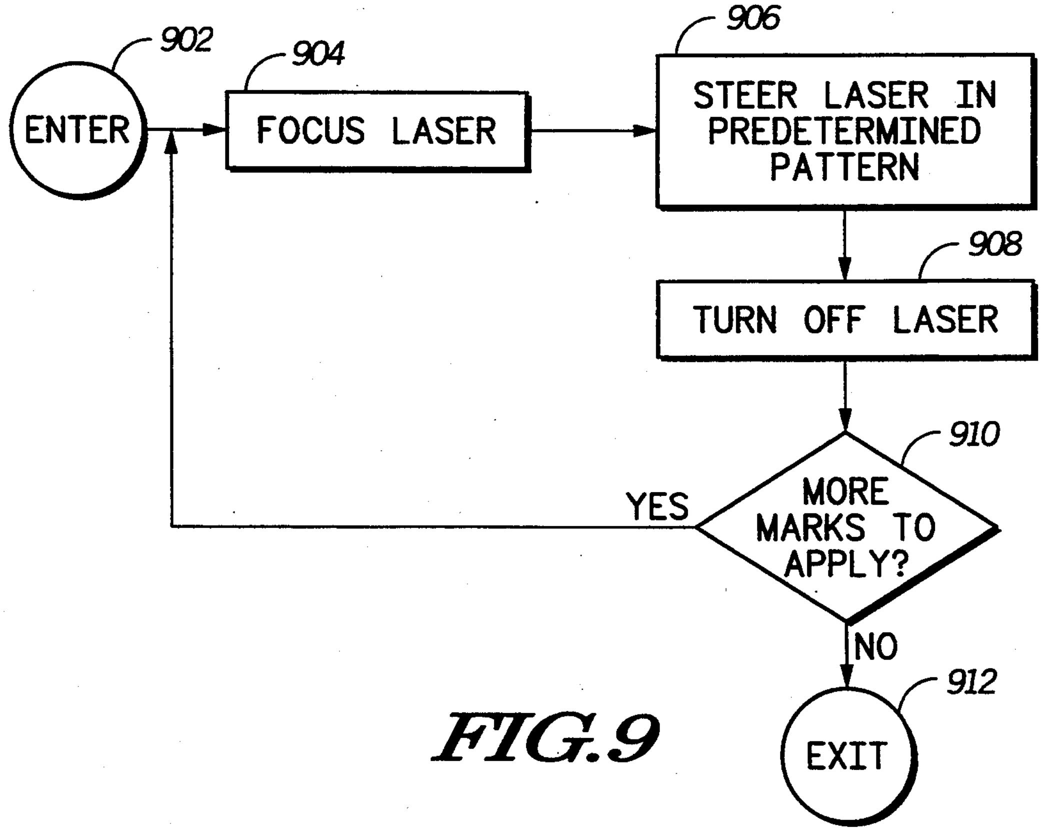
FIG. 9 is an operational flow diagram of a laser marking operation in a manufacturing process, according to the present invention.

FIG. 9 is an operational flow diagram of a laser marking operation in a manufacturing process, according to the present invention. As discussed earlier, in modern high volume manufacturing environments, it is very desirable to have the marking process be flexible with the manufacturing process. That is, the visible marks providing information about the product are best applied to the housing 202 after the product has been manufactured. Typically, at the point of marking, the housing substantially encloses at least one component of the product, e.g., the selective call receiver. Once the selective call receiver, or pager, arrives at the marking station, at step 902, preferably a robotic laser 210 focuses a laser beam 212 about a portion of the outer surface 704 of the housing 202, at step 904. As discussed earlier, other marking methods may be used at this point instead of the laser. For example, applying heat about the portion of the outer surface 704 of the housing 202 can be an acceptable alternative for creating the opaque marks 602 directly on the portion of the outer surface 704. Once the laser beam 212 is focused, at step 904, the robotic laser 210 can steer the laser beam 212 in a predetermined pattern, at step 906, to create the opaque mark 602 directly on the outer surface 704 of the housing 202. After the mark 602 is completely applied to the housing 202, at step 906, the robotic laser 210 turns off the laser beam 212, at step 908, and determines whether there are more marks to apply to the current product, at step 910. If there are more marks to apply then the robotic laser 210 focuses the laser beam 212 at the desired location on the housing 202, at step 904, and the marking process continues. If there are no more marks to apply to the current product, at step 910, then the robotic laser marking station 200 releases the successfully marked product allowing it to advance in the automated production line, at step 912. In this way, an automated manufacturing process can efficiently mark visible information on the housing of a manufactured product, such as a pager. The marking process can efficiently apply bar code information, graphical information, numeric information, and alphanumeric information to the pager housing as necessary.

Thus, a significantly improved method and apparatus has been disclosed for directly marking the housing of a manufactured product, such as an electronic device. By removing the need for applying labels to the outer surface of the housing, the manufacturing cost is reduced, less time is required for the manufacturing process, and the overall quality of the product is increased. By laser marking a translucent plastic housing, as discussed above, the internal components are protected from laser energy during marking, while the opaque marks created have more contrast with their background and are more recognizable.

What is claimed is:

1. A substantially transparent housing for an electronic device, the housing capable of enclosing at least one component therein and having the enclosed at least one component be visible from the outside of the housing, the housing comprising:

a single plastic layer having an outer surface and an inner surface;

a portion of the outer surface having opaque marks, the opaque marks providing information visible from the outside of the housing and;

a portion of the inner surface being textured to provide a translucent surface to enhance the visibility of the opaque marks.

2. The substantially transparent housing of claim 1, wherein the textured portion of the inner surface provides at least a partially light reflective surface for at least partially reflecting ambient light toward the portion of the outer surface having the opaque marks for enhancing the visibility of the opaque marks from the outside of the housing.

3. The substantially transparent housing of claim 1, wherein the opaque marks are laser marks on the outer surface of the housing.

4. The substantially transparent housing of claim 1, wherein the portion of the outer surface comprises plastic construction.

5. The substantially transparent housing of claim 4, wherein the housing is constructed of plastic.

6. The substantially transparent housing of claim 5, wherein the housing is constructed from LEXAN 141R polycarbonate resin plastic.

7. A method for marking a translucent plastic housing having an inner and an outer surface, where the contents to be enclosed within the housing are intended to be at least partially visible through the housing, the method comprising the steps of:

texturing at least a portion of the inner surface of a single plastic layer;

substantially enclosing at least one component of the contents within the housing wherein the textured portion provides protection to the at least one component of the contents when the opaque mark is applied; and applying an opaque mark directly on a portion of the outer surface, the portion of the outer surface at least partially overlapping the portion of the inner surface having the texturing.

8. The method of claim 7, wherein the applying step comprises the step of:

applying heat about the portion of the outer surface to create the opaque mark directly on the portion of the outer surface.

9. The method of claim 7, wherein the applying step comprises the step of:

focusing a laser beam about the portion of the outer surface to create the opaque mark directly on the portion of the outer surface.

10. The method of claim 9, wherein the focusing step comprises the step of:

focusing the laser beam just above the outer surface of the housing create the opaque mark directly on the portion of the outer surface.

11. The method of claim 9, wherein the focusing step comprises the step of:

steering the focused laser beam about the portion of the outer surface in a predetermined pattern to create the opaque mark directly on the portion of the outer surface.

12. The method of claim 11, wherein the steering step creates the opaque mark to represent visible information comprising at least one visible information from the set of:

a) bar code information;

b) graphical information;

c) numeric information; and d) alphanumeric information.

13. A selective call receiver comprising:

a housing for enclosing at least one component of the selective call receiver within the housing, the housing being at least partially transparent for allowing the enclosed at least one component to be at least partially visible from the outside of the housing, the at least one component including at least one of:

receiving means for receiving a message comprising an address;

decoding means coupled to the receiving means for decoding the received message, and for determining if the received address matches a predetermined address;

presenting means coupled to the decoding means for presenting the decoded message to a user; and alert means coupled to the decoding means for generating an alert if the received address matches the predetermined address; and the housing comprising a single plastic layer having an outer surface and an inner surface, a portion of the outer surface having at least one opaque mark thereon for providing information visible from the outside of the housing, and a portion of the inner surface being textured to provide a translucent surface to enhance the visibility of the at least one opaque mark.

14. The selective call receiver of claim 13, wherein the textured portion of the inner surface provides at least a partially light reflective surface for at least partially reflecting ambient light toward the overlapping portion of the outer surface for enhancing the visibility of the at least one opaque mark from the outside of the housing.

15. The selective call receiver of claim 13, wherein the at least one opaque mark includes at least one laser mark on the outer surface of the housing.

16. The selective call receiver of claim 13, wherein the portion of the outer surface comprises plastic construction.

17. The selective call receiver of claim 13, wherein the housing is constructed of plastic.

18. The selective call receiver of claim 13, wherein the housing is constructed of LEXAN 141R polycarbonate resin plastic.

19. The selective call receiver of claim 13, wherein the at least one opaque mark represents visible information comprising at least one visible information from the set of:

a) bar code information;

b) graphical information;

c) numeric information; and d) alphanumeric information.

* * * * *

UNITED STATES PATENT AND TRADEMARK OFFICE

CERTIFICATE OF CORRECTION

PATENT NO. : 5,420,575

DATED : May 30, 1995

INVENTOR(S) : John P. Cheraso, et al.

It is certified that error appears in the above-identified patent and that said Letters Patent is hereby corrected as shown below:

Claim 10, Column 7, line 50, after housing insert --to--.

Signed and Sealed this

Twentieth Day of February, 1996

Attest:

Bruce Lehman

BRUCE LEHMAN

*Attesting Officer* *Commissioner of Patents and Trademarks*